United States Patent [19]

Prina

[11] Patent Number: 4,993,684
[45] Date of Patent: Feb. 19, 1991

[54] VALVE FOR FLUID

[75] Inventor: Raphaël Prina, Perly, Switzerland

[73] Assignee: Honeywell Lucifer S.A., Carouge, Switzerland

[21] Appl. No.: 384,776

[22] Filed: Jul. 13, 1989

[30] Foreign Application Priority Data

Sep. 14, 1988 [EP] European Pat. Off. ........ 88810627.5

[51] Int. Cl.⁵ .......................................... F16K 27/02
[52] U.S. Cl. .................................. 251/367; 137/627.5
[58] Field of Search ...................... 137/627.5; 251/367

[56] References Cited

U.S. PATENT DOCUMENTS

| 2,834,368 | 5/1958 | Gray | 251/367 X |
| 3,070,125 | 12/1962 | Gulley | 251/367 X |
| 3,758,138 | 9/1973 | Roseman | 251/367 X |
| 3,819,152 | 6/1974 | Clippard | 251/367 |
| 4,406,306 | 9/1983 | Kolze | 137/625.43 X |
| 4,524,803 | 6/1985 | Stoll et al. | 137/625.66 X |

Primary Examiner—Gerald A. Michalsky
Attorney, Agent, or Firm—Young & Thompson

[57] ABSTRACT

A valve for fluid comprises a body (1) of molded synthetic resin, this body (1) being surrounded by a casing (25) constituted by an extruded profile. This casing (25) has openings (30) in which are fixed plugs (31) having a screw-threaded bore and constituting connectors permitting connecting the valve to the tubing. Joints (34) between the plugs (31) and the valve body are provided to permit relative displacement between these parts without loss of sealing during displacement due to differences of expansion of the members as a function of temperature.

5 Claims, 1 Drawing Sheet

VALVE FOR FLUID

The invention relates to a valve for fluid, comprising a body, at least one inlet passage for fluid and one outlet passage for fluid, a closure member between the inlet and outlet passages and a casing surrounding the body and having openings registering with said passages.

A valve of this type is known from Swiss patent No. 561,384.

The object of the present invention is to provide a valve of excellent mechanical reliability and easy fabrication and low cost.

To this end, the valve according to the invention is characterized in that the casing is of tubular shape obtained from an extruded profile, this housing bearing connectors in said openings.

The valve according to the present invention has the additional advantage of permitting the production of its body in materials other than metal. For example, it is particularly advantageous to make the body of the valve of a synthetic material by injection, which reduces the cost of production and the weight of the valve.

Other advantages and features of the invention will appear more clearly from the following description, with reference to the accompanying drawing, given schematically and by way of non-limiting example.

Figure 1:
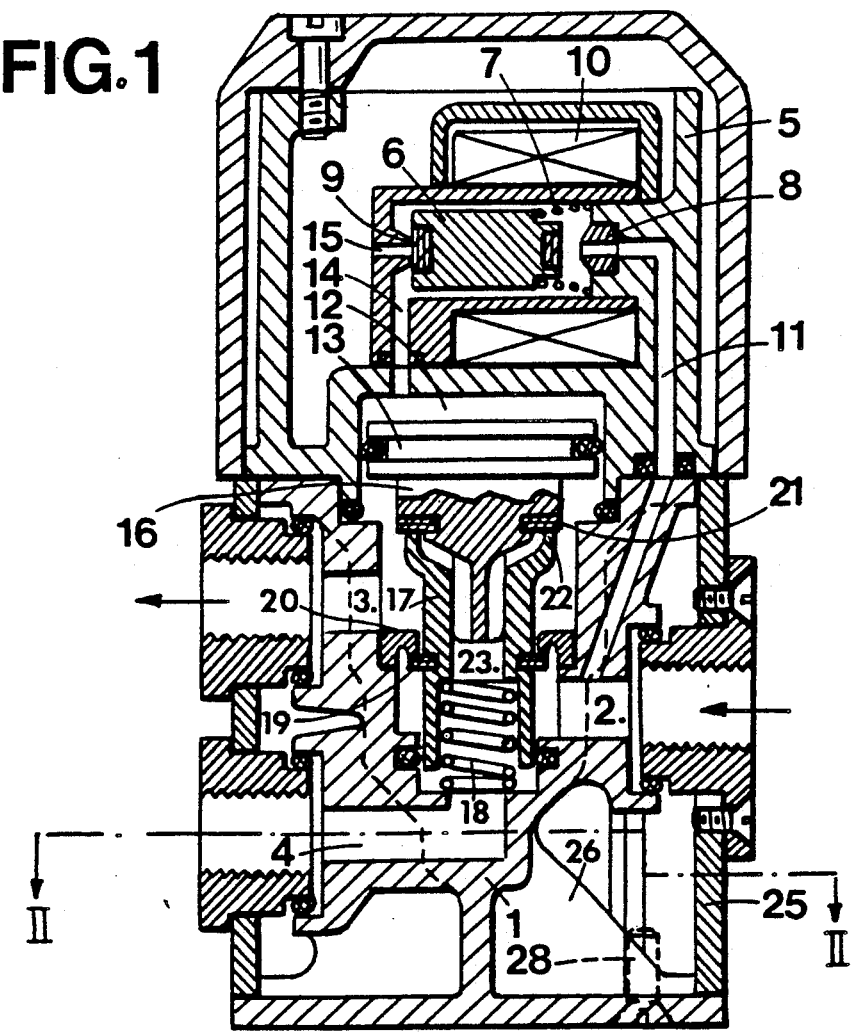
FIG. 1 is a cross-sectional view of the valve according to the invention.
Figure 2:
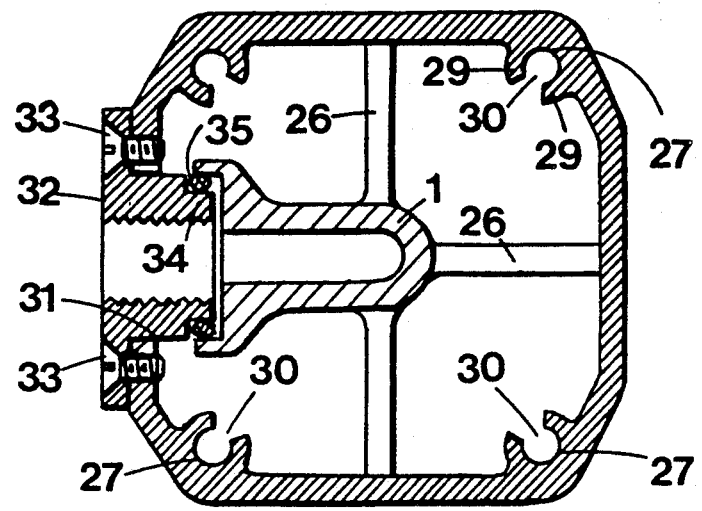
FIG. 2 is a section along line II—II of FIG. 1.

The valve with three paths and servo-control shown in the drawing comprises a body 1 having a passage 2 for the admission of fluid under pressure, a passage 3 to feed a utilizer not shown and a relief passage 4.

The control device of the valve is mounted on a support 5 secured to the body 1 and comprises a movable magnetic core 6 subject to the action of a spring 7 and coacting with two seats 8 and 9. The core 6 is subject to the magnetic field produced by a winding 10 which moves it against the action of spring 7 to close the seat 8. This latter is fed with fluid under pressure by a conduit 11 opening into passage 2. The fluid under pressure, for example compressed air, enters a chamber 12 to act on a piston 13, via a passage 14. When the core 6 is attracted position, the chamber 12 is relieved through a passage 15 of seat 9.

Piston 13 is part of a two-piece closure 16 and 17 which is shown in its intermediate position in which there is no communication between the passages 2, 3 and 4. However, it will be seen that air under pressure passing through conduit 11 will press 13 downwardly against the action of a spring 18 and will establish communication between the passages 2 and 3 by moving an annular valve member 19 from a seat 20.

To provide relief, the core 6 is drawn to its position in which it closes seat 8, which relieves chamber 12 through passage 15 and permits displacement of piston 13 upwardly by the pressure prevailing in the utilizer, which pressure is transmitted by passage 3 below the lower surface of piston 13. Member 16 of the closure then moves away from member 17, which raises an annular valve member 21 from its seat 22 thereby placing in communication the passage 3 and 4 via the axial bore 23 of the member 17.

The body 1 of the valve is surrounded on its four sides by a casing 25 of tubular shape, obtained from an extruded profile for example of metal.

This casing (or profile) 25 is centered on ribs 26 of body 1 and has four grooves 27 adapted to receive securement screws 28 for securing casing 25 to body 1. The grooves 27, of circular section, extend longitudinally axially of profile 25, along all the length of the latter, and are defined by two lips 29 separated by a longitudinal slot 30 and located on the internal wall of said profile.

The casing 25 has openings 31 in which are disposed connectors 32 constituted by screw-threaded inset plugs, inserted from outside the casing and fixed to the latter by screws 33. These connectors 32 have a ferrule 34 adapted to engage with radial play in one of said passages 2, 3 and 4 of the body 1, this radial play being damped by an annular joint 35 permitting axial displacement between said connectors and the body 1. This construction is particularly appropriate, because the axial displacement between the connectors and the body 1 permits maintaining fluidtightness despite differences of thermal expansion which generally exist between the body 1 which is preferably of molded synthetic resin and the metallic casing 25.

The described construction is of interest because it permits maintaining a stock of valves without connectors 32 and of mounting the latter for delivery to the client having regard for its requirements for the dimensions of the screw threading of said connectors.

Of course numerous variations of embodiment could be provided and it is clear that the principle of a cast valve body whose solidity is ensured by an extruded profile forming an envelope may be used in practically all known valve types with two or more paths provided or not with servo-control. Likewise, the provision of joints between bodies and plugs may be effected differently and it could very well be conceived that the body have ferrules penetrating a bore of the connecting plugs. Joints could also be disposed between two flat surfaces of the plug and of the body, this joint then being adapted to be elastically deformed in the axial direction of the connector-body connection.

What is claimed:

1. Valve for fluid, comprising a body, at least one inlet passage for fluid and one outlet passage for fluid, a closure member between the inlet and outlet passages and a casing surrounding the body and having openings located in registry with said passages, characterized in that the casing is of tubular shape of uniform cross-sectional configuration apart from said openings, this casing having connectors in said openings, and screws detachably interconnecting said connectors and said casing.

2. Valve according to claim 1, characterized in that the connectors are constituted by inset plugs, inserted from the outside of the casing and detachably fixed to this latter.

3. Valve according to claim 1, characterized in that at least one of the connectors has a ferrule providing radial play with one of said passages of the body, this play being damped by an annular joint permitting axial displacement between said connector and the body.

4. Valve according to claim 1, characterized in that the casing has at least two grooves extending axially longitudinally of the cross-sectional configuration and along all the length of the latter, these grooves having a circular section and being adapted to receive screws for securing the casing.

5. Valve according to claim 4, characterized in that said grooves are defined by two lips separated by a longitudinal slot and located on the internal wall of the cross-sectional configuration.

* * * * *